H. Martin,
Screw Cutting Machine.
No. 112,612.  Patented Mar. 14, 1871.
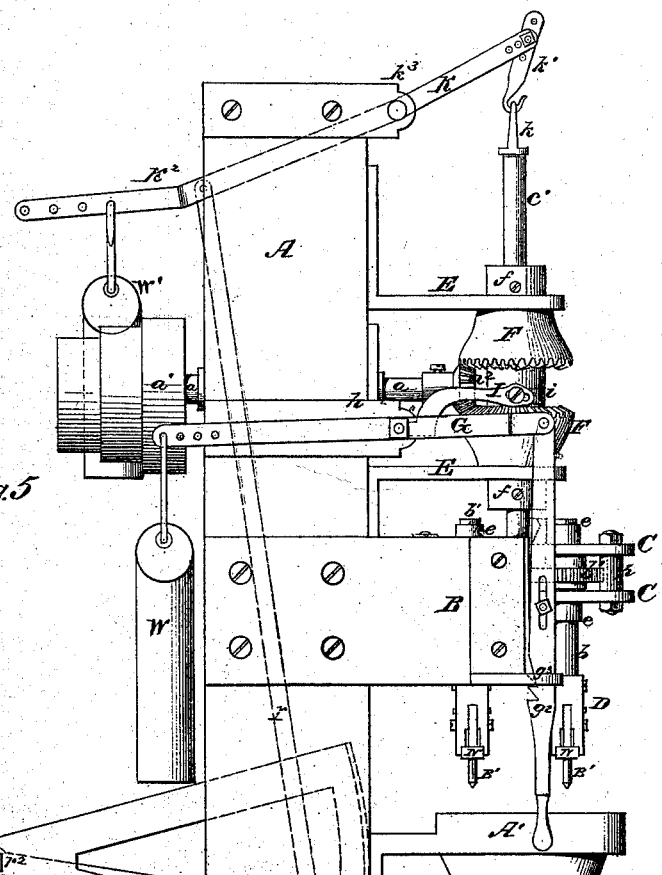
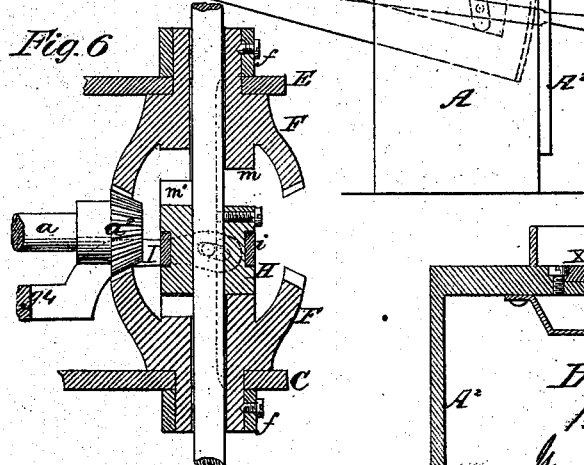
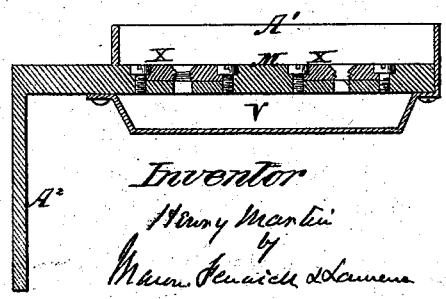
Inventor
Henry Martin
by
Mason, Fenwick & Lawrence
Witnesses.

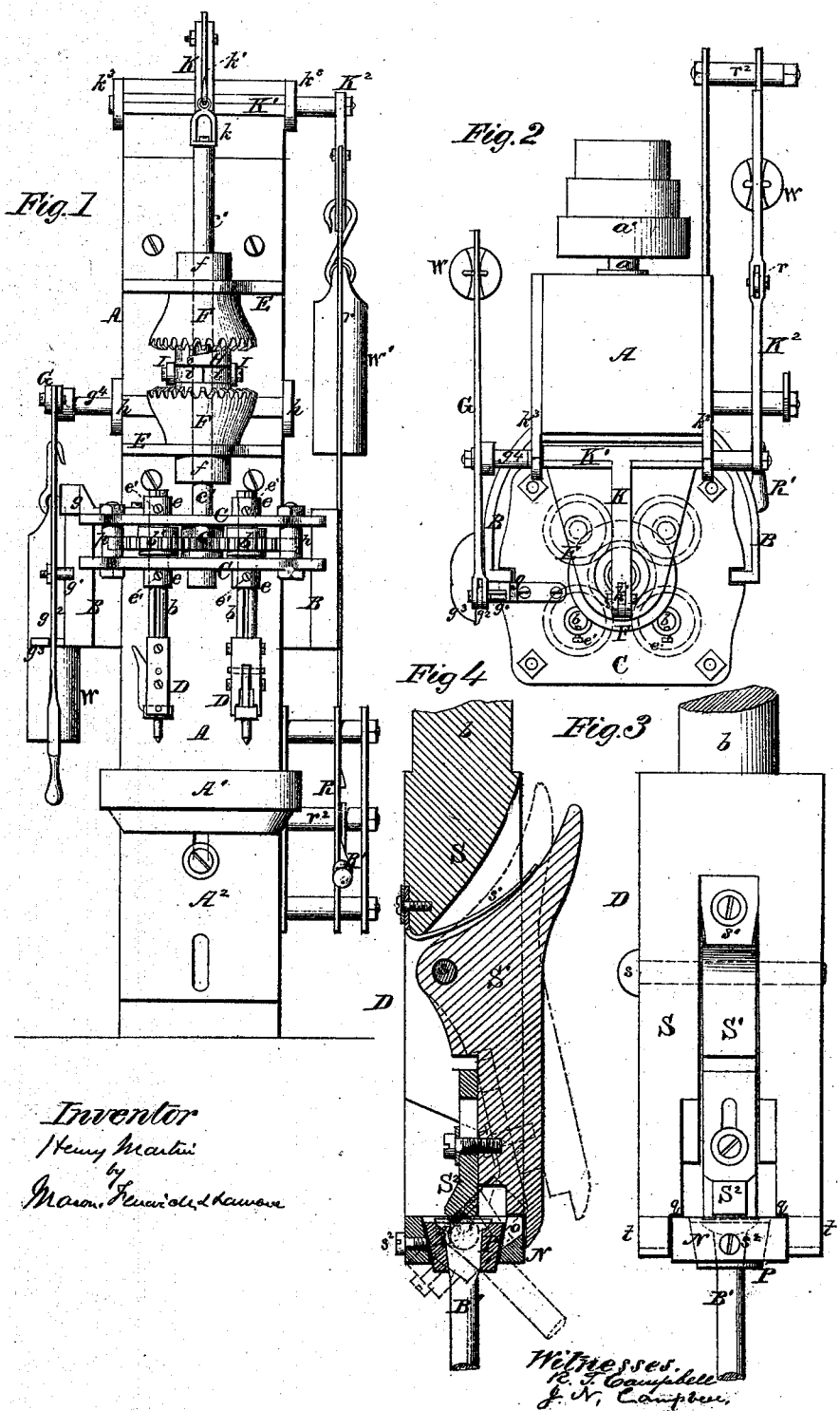

UNITED STATES PATENT OFFICE.

HENRY MARTIN, OF LOUISVILLE, KENTUCKY.

IMPROVEMENT IN MACHINES FOR CUTTING SCREW-THREADS ON BOLTS.

Specification forming part of Letters Patent No. 112,612, dated March 14, 1871.

*To all whom it may concern:*

Be it known that I, HENRY MARTIN, of Louisville, in the county of Jefferson and State of Kentucky, have invented a new and Improved Machine for Cutting Threads on Bolts; and I do hereby declare that the following is a full, clear, and exact description thereof, reference being had to the accompanying drawing, making part of this specification, in which—

Figure 1, Plate 1, is a front view of the improved machine, showing bolt-blanks applied to their holders, and the several parts in position for commencing the threading operation. Fig. 2, Plate 1, is a top view of the machine. Figs. 3 and 4, Plate 1, show the construction of the bolt-holders. Fig. 5, Plate 2, is an elevation of one side of the machine. Fig. 6, Plate 2, is a diametrical section through the right-and-left clutching devices of the main spindle. Fig. 7, Plate 2, is a section taken vertically through the top, bed, two of the taps or screw-plates, and the oil-basins.

Similar letters of reference indicate corresponding parts in the several figures.

This invention relates to certain novel improvements on machinery adapted for cutting threads on bolts.

It consists, first, in a bolt holding and centering device applied on the lower end of a vertically-movable spindle, which latter is arranged over a device for cutting screw-threads, as will be hereinafter explained; second, in one or more spindles, which carry bolt-holders on their lower ends, and which are vertically adjustable independently of each other, and vertically movable collectively, whereby threads can be cut on bolts of different lengths, or of the same length, as will be hereinafter explained; third, in a vertically-movable frame carrying a gang of spindles having bolt-holders applied to their lower ends, which spindles are all rotated simultaneously by means of gear-wheels, the central one of which is on a spindle which is hung from a lever having a counterbalancing-weight that will prevent the weight of said frame and spindles from pressing unduly on the threads while being cut, as will be hereinafter explained; fourth, in the combination of a rack, a hand-lever, and a connecting-rod with the lever from which the main driving-spindle is hung, whereby the attendant can elevate the gang of spindles and their frame and support the same in an elevated position, as will be hereinafter explained; fifth, in the combination of a tripping device with a right-and-left reversing-clutch, whereby the machine can be set for cutting threads of different lengths, and when any given length of thread is cut the said device will automatically reverse the motions of the spindles and withdraw the bolts from their tops or screw-plates, as will be hereinafter explained.

To enable others skilled in the art to understand my invention, I will explain its construction and operation.

In the accompanying drawing, A represents a post, which is secured rigidly in an upright position. B B are two vertical guides for a horizontal vertically-movable frame, C, which carries spindles *b b b b*. This frame consists of two horizontal plates, connected together, at a proper distance apart, by means of shouldered posts *p*, on the ends of which nuts are applied.

Between the two plates constituting frame are five spur-wheels, the central one, *c*, of which is keyed on the lower end of a vertical spindle, *c'*, and the others, *b'*, engage with this central wheel and are applied on the spindles *b*. Each spindle *b* is connected to its wheel *b'* by means of a feather and groove, the latter being made into the spindle, so as to allow the spindle to be adjusted vertically.

Each spindle *b* is held by means of two collars, *e e*, arranged above and below frame C, through which set-screws *e'* pass and bear against the spindle. By loosening the set-screws *e' e'* spindle *b* can be adjusted up or down through the hub of wheel *b'*, according to the length of the bolts which are to be threaded. By thus making the spindle *b* adjustable, independently of each other bolts of different lengths can be applied to the machine and threads cut on them at one and the same time.

On the lower end of each spindle *b* is a bolt-holder, consisting of a rectangular enlargement, S, which is vertically and centrally slotted to receive a hand-lever, S¹, which is acted upon by a spring, *s*¹, and pivoted at *s*. To this lever S¹ a vertically-adjustable head-holder, S², is applied, and below this head-holder is a chuck, P, which is secured into an oscillating bed or chuck-holder, N. The chuck P is adapted to receive the heads and angular shanks of the bolts; or, if desirable, the oscillating bed may receive the bolts directly, and when the holder N is held by the lever S¹ and shoulders $g\ g$ in the horizontal plane, (indicated by Figs. 3 and 4 in full lines,) the vertical axis of a bolt, B′, in the chuck will coincide with the vertical axis of the spindle $b$.

The chuck-holder N is connected to the lower ends of the enlargement S by means of trunnions $t\ t$, which, when the lower end of lever S¹ is forced out, by grasping its upper end the said holder can be tilted forward, as indicated by dotted lines, Fig. 4, and the bolt B′ readily removed or a bolt-blank introduced.

The spring $s^1$, acting upon the upper arm of lever S¹, forces the lower notched end of this lever against the edge of the chuck-holder when the latter is horizontal, and thus holds it in this position. At the same time it brings the head-holder S² directly over the head of the bolt and keeps the latter down in place in its chuck P. The opening through the chuck P is adapted to the size and shape of the heads and shanks of the bolts to be threaded, and a set-screw, $s^2$, is used to hold the chuck in place in the holder, and allow a chuck to be removed and another to be introduced in its stead.

The notch $o$ in the back part of the chuck-holder N is intended to receive the end of the head-holder S² when the parts are adjusted, as indicated in dotted lines, Fig. 4.

The spindle $c'$ passes up through two bell-shaped bevel spur-wheels, F F, and through a double clutch, H, and is attached by a swivel to a stirrup, $k$, which latter is suspended from an arm, K, by means of an adjustable hooked rod, $k^1$. The arm K projects from an oscillating bar, K¹, which is supported by bearings $k^3\ k^3$, and to one end of this bar another arm, K², is rigidly secured, which extends backward and has suspended from it a weight, W′. The weight W′ thus serves to counteract, in a measure, the weight of the frame C and its spindles, so that there will not be an undue weight upon the screw-threads while being cut. The weight of the frame C and its spindles should preponderate a little over the weight of W′.

The wheels F F are connected to brackets E E by means of collars $f\ f$, so that these wheels may turn freely, at times independently of the spindle $c'$, which passes through their axes.

The teeth on wheels F F are engaged by the teeth of a bevel-pinion, $a^2$, which is on a horizontal driving-shaft, $a$, carrying also pulleys $a^1$; consequently, said wheels F F are rotated in opposite directions. Between the two bell-shaped wheels F, and connected to spindle $c'$ by a key-tenon and a groove, is a clutch, H, having teeth on opposite ends pitched in opposite directions. Inside of the wheels F F are clutch-teeth $m$, which correspond to the teeth on the clutch H.

It will be seen that the spindle $c'$ can be caused to rotate either to the right or to the left by adjusting the clutch H so as to engage with one or the other; and it will also be seen that spindle $c'$ and the frame C and spindles $b$ can all move up or down, whether spindle $c'$ be rotating or not.

The arm K² is connected by a rod, $r$, to a hand-lever, R′, by vibrating which the frame C and its attachments can be moved up or down.

The rack R is used to hold down hand-lever R′ when the frame C and its attachments are elevated, as shown in Fig. 1.

When lever R′ is disengaged from its rack R the said parts C $b\ c'$ will descend by their own gravity.

By means of a band, $i$, and a yoke-arm, I, the clutch H can be moved up or down.

The arm I projects from a rock-shaft, $g^4$, which is supported by bearings $h\ h$, and which carries on one end a lever, G. From the rear end of lever G a weight, W, is suspended, and to the front end of this lever a rod, $g^2$, is pivoted. This rod $g^2$ extends down and terminates in a handle, and between the handle and its upper end a stud, $g^1$, is secured by a nut applied on its stem, which latter passes through a vertically-oblong slot. This allows the stud $g^1$ to be adjusted up or down.

To the lower part of the guide B, nearest rod $g^2$ a shelf, $g^3$, is secured, having a knife-edge formed on its front edge for engaging with one or the other of two notches made into the edge of said rod $g^2$. (Shown in Fig. 5.) The notches in rod $g^2$ are so arranged relatively to the position of the clutch H and the wheels F F that when this rod is drawn down and its highest notch engaged with the knife-edge $g^3$, the clutch H will be engaged with the lower wheel F; and when the lower notch is engaged by the knife-edge $g^3$ the clutch will not engage with either one of wheels F.

When the rod $g^2$ is released from the knife-edge $g^3$ the weight W will throw up the clutch H and engage it with the upper wheel F.

Now, in order to reverse the rotation of the spindles $c'\ b$ at any desired point during the descending stroke of these spindles and the frame C, I fasten to this frame C a beveled trip, $g$, and adjust the stud $g^1$ so that at the moment the required length of thread is cut on the bolt the trip will disengage the rod $g^2$ from its knife-edge $g^3$ and allow weight W to move clutch H from the lower wheel F to the upper wheel F, thus unscrewing the bolts from their taps.

The taps or screw-plates X X are applied fast to a bed, M, which is surrounded by a ledge, A¹, and which has secured beneath it a pan, V. The ledge A¹ and pan V form a basin to contain oil for the taps or screw-plates and bolts during the process of threading.

The taps and tap-bed are arranged horizontally beneath the spindles $b$, and applied to a vertically-adjustable plate, A², which is secured to post A.

It is obvious that a machine with a single spindle and bolt-holder can be made by dispensing with the spindles $b$ $b$, their bolt-holders, and the gearing for operating the spindles, and making the shaft $c'$ to extend down below the guide-frame C, and applying a bolt-holder, such as described, upon its lower end, in the same manner that it is applied upon the spindle $b$. In this case the screw-cutting die-bed would be tapped in its center only, and the frame C would be connected to the shaft $c'$ by collars, which would insure a vertical movement, together with the frame and shaft, but permit an independent rotary movement of the shaft.

I, however, do not regard such an arrangement as useful and valuable as the plan represented, as only one bolt can be threaded at a time by the modification suggested, whereas four at a time can be threaded by the plan represented in the drawing.

Having thus described my machine and the manner of its operation, I now claim nothing as new therein but the following:

1. In combination with a rotating spindle of a bolt-threading machine, a bolt-holding mechanism comprehending a stock integral with or attached to the end of the spindle, a socket-piece connected to the extremity of said stock by gudgeons or otherwise, but so, nevertheless, that a rocking motion may be imparted to it in a plane at an angle to the plane of its rotation, and a device, also connected to said stock, to clamp and firmly hold the bolt in the socket, substantially as described.

2. In combination with the bolt-holding mechanism set forth in the first clause of claim, a series of interchangeable chucks or bushings, P, as set forth.

3. The bolt-holding and centering device D, consisting of the slotted head S, the hand-lever $S^1$, and its head-holder $S^2$, in combination with a rocking holder, N, substantially as described.

4. The frame C C, in combination with the outside guides, B B, of the main frame A, shaft $c'$, bolt-carrying spindles $b$, constructed and operating substantially as and for the purpose described.

5. The weight $W'$, oscillating arm K $K^2$, union $K^1$, and adjusting device $R'$, in combination with the suspending and spindle-driving shaft $c'$, and with the movable spindle and gear-supporting frame C, substantially as and for the purpose herein described.

6. In combination with one or more rotating and vertically-movable bolt-holding spindles, and one or more screw-threading dies fixed upon a permanent table, a clutching apparatus located on said spindle, by which the motion of rotation of the latter may be reversed, a lever and a catch, the former weighted at one end for holding the movable section of the clutch apparatus in contact with one of the stationary sections thereof, and a hook on the other end to engage with the catch when said central section of the clutch is brought in contact with the other stationary section, and a frame or other device integral with or attached to the spindle, the whole combination being such that the dies, in drawing the spindle toward them while cutting, shall force the frame to release the hook of the lever from the catch, and thus cause the reversal of the clutch apparatus and the reversal of the movement of rotation of the spindle.

7. The tripping device $g$, $g'$, $g''$, $g'''$, and $c''$, applied as and for the purpose described in both threading-machines.

8. The loaded lever G, rock-shaft $g^4$, clutch-arm I, and rod $g^2$, in combination with knife-edge $g^3$, tripping device $g$ $g'$, and the vertically-movable spindle-frame C, substantially as described.

9. The combination of the tap-bed M, oil-basin $A^1$ and V, gang of vertical spindles $b$, bolt-holders D, and vertically-movable frame C, substantially as described.

10. The machine, constructed as herein described, for threading bolts and withdrawing them from their taps, and also adjusting them to an inclined position for ready removal, all as set forth.

HENRY MARTIN.

Witnesses:
CHRISTIAN BEST,
ROBT. W. RAMSEY.